US008087114B2

(12) United States Patent
Lundevall

(10) Patent No.: US 8,087,114 B2
(45) Date of Patent: Jan. 3, 2012

(54) THIN POCKET MATTRESS, AND METHOD AND DEVICE FOR ITS MANUFACTURING

(75) Inventor: Andreas Lundevall, Vänersborg (SE)

(73) Assignee: Stjernfjädrar AB, Herrljunga (SE)

( * ) Notice: Subject to any disclaimer, the term of this patent is extended or adjusted under 35 U.S.C. 154(b) by 4 days.

(21) Appl. No.: 11/659,326

(22) PCT Filed: Sep. 8, 2005

(86) PCT No.: PCT/SE2005/001296
§ 371 (c)(1),
(2), (4) Date: Mar. 27, 2008

(87) PCT Pub. No.: WO2006/043862
PCT Pub. Date: Apr. 27, 2006

(65) Prior Publication Data

US 2008/0282476 A1 Nov. 20, 2008

(30) Foreign Application Priority Data

Oct. 18, 2004 (SE) .................................... 0402501

(51) Int. Cl.
*A47C 23/04* (2006.01)
*A47C 16/00* (2006.01)
*B68G 5/00* (2006.01)
*F16F 3/04* (2006.01)
*F16F 1/06* (2006.01)

(52) U.S. Cl. .................. 5/720; 5/716; 5/655.8; 267/91; 267/166

(58) Field of Classification Search .............. 5/716, 720, 5/655.8; 267/91, 94, 95, 166, 166.1, 174
See application file for complete search history.

(56) References Cited

U.S. PATENT DOCUMENTS 3,462,779 A 8/1969 Thompson
3,668,816 A * 6/1972 Thompson ..................... 53/418
6,143,122 A * 11/2000 Mossbeck et al. ............ 156/291
6,591,438 B1 7/2003 Edling
2004/0103618 A1 6/2004 De Santis et al.

FOREIGN PATENT DOCUMENTS

NO 318470 9/2001
SE 517533 6/2002
WO WO 00/58203 10/2000

OTHER PUBLICATIONS

An Office Action dated Jul. 17, 2009 issued in corresponding Chinese Application No. 2005-80031834.8 and English translation.
International Preliminary Examination Report dated Jan. 23, 2007.

* cited by examiner

*Primary Examiner* — Jonathan Liu
(74) *Attorney, Agent, or Firm* — Harness, Dickey & Pierce, P.L.C.

(57) ABSTRACT

A spring mattress includes a plurality of strings interconnected side by side, each string including a continuous casing material with a plurality of pockets, said pockets being defined by at least one longitudinal connecting line extending parallel to the longitudinal direction of the string and a plurality of transverse connecting lines extending transversely to the longitudinal direction of the string, and coil springs arranged in the pockets of the string. For at least one of the springs, casing material portions arranged at the ends of the spring are moved towards each other, through the spring, and connected to each other. The connecting lines are arranged at the side of the springs and, thus, between neighboring springs. The interconnected casing material portions are thus at the ends of the springs essentially free of other connections.

22 Claims, 3 Drawing Sheets

THIN POCKET MATTRESS, AND METHOD AND DEVICE FOR ITS MANUFACTURING

FIELD OF THE INVENTION

The present invention relates to a spring mattress comprising springs enclosed in casings, referred to as a pocket mattress, as well as a method and a device for manufacturing such a mattress.

BACKGROUND ART

A common technique of making spring mattresses is the so-called pocket technique. This means that the springs are enclosed in pockets, that is they are individually enclosed by a casing material. In this way, the springs will be relatively individually resilient so that they can flex individually without affecting the neighboring springs and, thus, the comfort to the user increases since his weight will be distributed more uniformly over the surface that receives the load.

A drawback of this type of mattress is, however, that it is difficult to provide thin mattresses. If the length of the springs is reduced without a corresponding reduction of the width, the spring will, especially when the length approaches the length of the diameter of the spring, have a tendency to turn in the casing, which dramatically deteriorates the comfort of the mattress. When such mattresses are to be manufactured, the existing technique requires the use of a much larger number of springs. Consequently the manufacturing will be considerably more expensive and more complicated. Besides it is difficult to prevent such mattresses from also being stiffer since too thin spring wires cannot be used.

For these reasons, it has not been possible to use spring mattresses for many purposes where thinner mattresses are required, such as for overlay mattresses, seat cushions and the like. In spite of this, spring mattresses have several properties making it desirable to use them also in these contexts, such as excellent comfort, individual flexibility, a long life and easy and inexpensive manufacture.

A solution to this problem has been presented by the same applicant in WO 00/58203. In this solution, the end portions of the casings are moved towards each other, which gives a bias of the springs, and a very compact and useful mattress. A drawback of this mattress is, however, that it is relatively complicated and expensive to manufacture. Moreover the moving together of the end portions counteracts the normally desired individual and independent resilience of the individual enclosed springs.

SUMMARY OF THE INVENTION

It is therefore an object of the present invention to provide a spring mattress of the type mentioned by way of introduction, as well as a method and a device for manufacturing the same, in which the above related draw-backs are eliminated wholly or at least partly.

This object is achieved by a spring mattress as well as a method and a device for manufacturing the same according to the claims.

According to a first-aspect of the invention, a spring mattress is provided, comprising a plurality of strings interconnected side by side, each string comprising a continuous casing material with a plurality of pockets, said pockets being defined by at least one longitudinal connecting line extending parallel to the longitudinal direction of the string and a plurality of transverse connecting lines extending transversely to the longitudinal direction of the string, and coil springs arranged in the pockets of the string. For at least one of the springs, casing material portions arranged at the ends of the spring are moved towards each other, through the spring, and connected to each other. Moreover, the connecting lines are arranged at the side of the springs, and thus between neighbouring springs. Preferably, the interconnected casing material portions at the ends of the springs are thus essentially free of other connections.

This mattress is of the general type as disclosed in U.S. Pat. No. 6,591,438 by the same applicant, which is herewith incorporated by reference, and thus has essentially all advantages that are associated with this type of mattress, such as the possibility of making the mattress thin, the advantageous bias of the springs etc. However, the inventive mattress also gives a number of additional advantages. For instance, the new mattress has been found surprisingly cost-effective to manufacture. This is due to, inter alia, the fact that the manufacturing process can be made more effective since it is not necessary to turn the springs after insertion into the pockets of the casing material. Moreover, the arrangement of the connecting lines at the side of the springs instead of over the ends of the same has surprisingly been found to allow a considerable reduction of the amount of casing material that is required.

Moreover, connecting lines extending over the ends of the springs cause problems with so-called false lofts, that is accumulations of material over the springs which increase the height of the mattress but do not exhibit resilience and, thus, do not add to the comfort of the mattress. On the contrary, such false lofts can give a lumpy and uneven surface, which reduces comfort. With the new mattress, the occurrence of such false lofts is effectively avoided, and the height of the mattress corresponds substantially to the height of the springs, with a single smooth casing layer over the ends of the springs.

In addition, the relatively smooth casing at the ends of the springs gives the possibility of easily fastening the end portions of the casing to each other through the springs, by, for instance, welding, which enables very efficient manufacture.

Moreover, it has surprisingly been found that the new mattress can be made still thinner than the known mattresses of the type disclosed in WO 00/58203. Preferably, the compressed springs of the new mattress have a height below 6 cm, preferably below 5 cm, and most preferred below 4 cm.

The new mattress can also be made with the springs further spaced apart, that is with a lower spring frequency over the mattress surface, than in prior-art mattresses of this type. It has surprisingly been found that such spacing apart of the springs in the mattress did not have a detrimental effect on the comfort of the mattress. On the contrary, this has enabled a greater degree of individual and independent resilience of the springs. The avoiding of connecting lines over the spring ends reduces the effect that the springs are pulled towards each other as the ends are moved together. As a result, a mattress of this type with the springs more spaced apart is made possible. In cases where a separation distance has been introduced between springs in the strings, the avoiding of connecting lines over the spring ends thus ensures that the separation can be better kept also in the biased position, which allows a more cost-effective mattress, with fewer springs, of this biased, thin type. In such a mattress with fewer springs, it is possible to use a greater wire thickness of the coil springs and still achieve the same softness of the mattress as in a corresponding mattress where the springs are positioned more closely together. This is advantageous since it is usually both less expensive and easier to handle thick wire coil springs than thin wire coil springs. Alternatively, it is possible in the above-defined mattress to obtain enhanced softness compared with prior-art mattresses of the same thickness. This is favorable since it has previously been complicated and sometimes even impossible to obtain the requested softness of the prior-art mattresses of this type. In particular this advantage is achieved in the new mattress since the strings are connected to each other via the longitudinal connecting lines. This results in a mattress with fewer springs, where also very efficient utilization of the material of the casings is obtained.

The longitudinal connecting lines and the transverse connecting lines of the strings preferably extend substantially at right angles to the longitudinal axes of the springs. Furthermore the longitudinal connecting lines and the transverse connecting lines of the strings preferably extend in essentially the same plane, which plane preferably is substantially perpendicular to the longitudinal axes of the springs.

Connecting the strings to each other via the longitudinal connecting lines has been found surprisingly advantageous. By the longitudinal connecting lines, which typically consist of welds, in many cases projecting from the string, an advantageous separation of the strings is automatically obtained. Moreover, the strings are in this way attached to each other only along a line, and preferably only at a number of points along this line. This has been found to give a very flexible mattress, where the springs are extremely movable in relation to their neighbours. Due to the limited height of the springs and the holding-together given by the moved-together end portions, the springs are safely held in place anyway. This eliminates the risk that springs are positioned in the wrong direction etc, which would otherwise be expected in connection with such a solution.

Preferably, the casing portions at the spring ends are moved so far towards each other as to make contact with each other. It is also preferred for the casing portions at the spring ends to be moved so far towards each other that the springs are biased. The casing portions at the spring ends are preferably connected to each other by welding. The connection is preferably given such a size and shape that the connection obtains sufficient strength and stability. Furthermore the shape and size of the connection can be varied to give different degrees of bias of the springs. In this way, it is possible to easily vary the bias between different mattresses, and also between different springs in one and the same mattress.

The connecting lines advantageously consist of a surface joint, such as an adhesive, a weld or the like. It is also preferred for the casing to be a preferably weldable textile material.

The springs, through which the casing material portions arranged at the spring ends are moved towards each other, preferably have a height which is less than the width of the springs, preferably less than ⅔ of the width, and most preferred is about ½ the width or less.

With the new mattress, the springs can be stably kept in place in both manufacture and use, which allows extremely thin mattresses. Furthermore the use of casing material can be optimized and significantly limited since the amount of casing material that is necessary is directly dependent on the height of the mattress, and thus decreases when the mattress is made thinner. Moreover it has been found that the arrangement of the connecting lines, such as welds, at the side of the springs gives a considerably simplified and more cost-effective manufacture than for prior-art solutions.

Moreover, the new mattress has, compared with the known mattress of the same general type, been found to be substantially more flexible and stretchable in the lateral direction. This is especially due to the fact that the mattress is not made significantly more compact when moving the end portions together. Moreover, it is due to the advantageous joining of the strings to each other via the longitudinal connecting line positioned at the side of the strings. This allows a certain degree of movableness and flexibility. Moreover, the connection of the pockets, which in all directions is arranged only in the centre of the strings, implies that the individual pockets can be pulled out by compressing the spring, so that the mattress is extended in the lateral direction. All in all, the increased flexibility allows the mattress to better follow the user's body in all directions, thus increasing the comfort for the user.

According to a second aspect of the invention, a method for manufacturing a spring mattress is provided, comprising the steps of enclosing springs in pockets in strings of a casing material, said pockets being made of a continuous casing material with at least one longitudinal connecting line extending parallel to the longitudinal direction of the string and a plurality of transverse connecting lines extending transversely to the longitudinal direction of the string;

moving casing portions arranged for the ends of the spring towards each other and connecting them to each other; and interconnecting a plurality of strings side by side;

wherein the above-mentioned steps are carried out so that the connecting lines are arranged at the side of the springs and, thus, between neighboring springs.

With this method a mattress of the type discussed above is manufactured, and corresponding advantages as related with regard to this new mattress are achieved by this method.

According to a third aspect of the invention, a device for manufacturing spring mattresses is provided, comprising means for enclosing coil springs in pockets of strings, said pockets being made of a continuous casing material with at least one longitudinal connecting line extending parallel to the longitudinal direction of the string and a plurality of transverse connecting lines extending transversely to the longitudinal direction of the string;

means for moving casing portions arranged for the ends of the spring towards each other and connecting them to each other; and means for interconnecting strings side by side;

wherein the means for enclosing the coil springs is adapted to arrange the connecting lines at the side of the springs so as to be positioned between neighboring springs of the completed mattress.

With this device, a mattress of the type discussed above is manufactured, and corresponding advantages as related with regard to this new mattress and method are achieved by this device.

Preferably the means for moving casing portions arranged for the ends of the spring towards each other and connecting them to each other comprises welding equipment movable in the spring direction. The welding equipment is preferably adjustable, the size of the generated weld being controllable. As a result, the bias of the springs and the height of the mattress can easily be controlled and varied, both between different mattresses manufactured by the same device and within one and the same mattress, to obtain zones with different properties within the mattress.

These and other advantages of the current invention will be evident from the following detailed description of specific embodiments.

BRIEF DESCRIPTION OF THE DRAWINGS

In the accompanying drawings

DESCRIPTION OF PREFERRED EMBODIMENTS

For the purpose of exemplification, the invention will now be described in more detail by way of an embodiment and with reference to the accompanying drawings.

Figure 1:
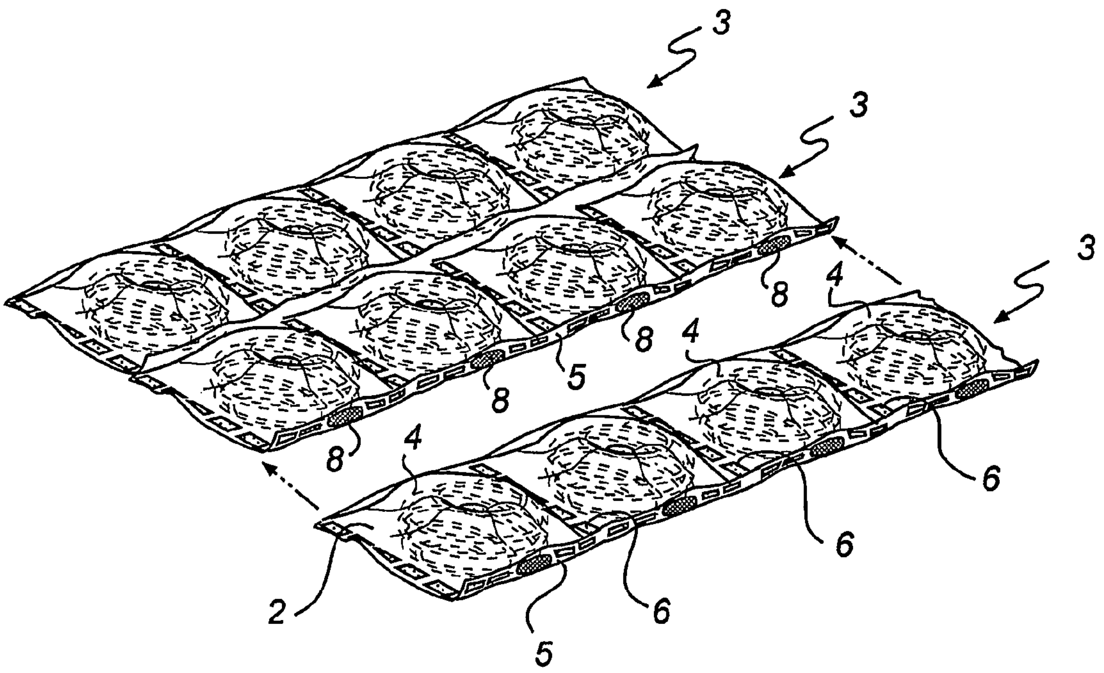
FIG. 1 is a perspective view of a mattress according to an embodiment of the invention, indicating a operation which is to be performed.
Figure 2:
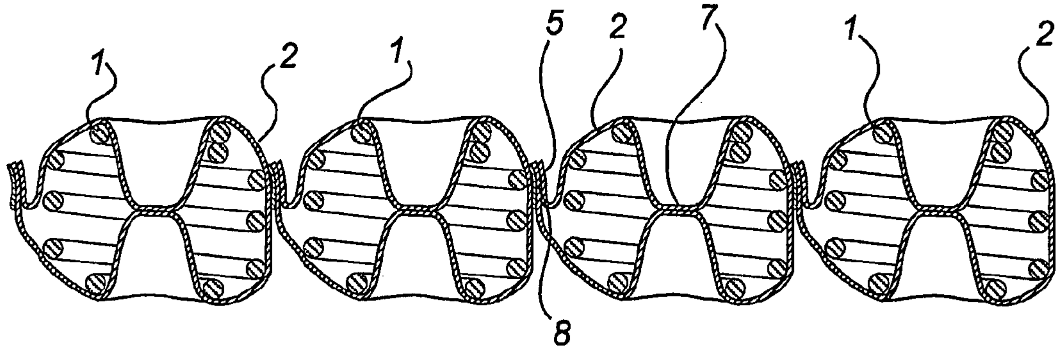
FIG. 2 is a sectional side view of part of the mattress in FIG. 1 seen in the string direction.

A spring mattress according to the invention comprises a plurality of interconnected coil springs 1 enclosed in casings 2, as shown in FIGS. 1 and 2. The casing is suitably made of a, preferably weldable, textile material, but also other materials, such as different types of plastic materials, can be used. It is also possible to use non-weldable textile materials, such as cotton cloth.

The mattress comprises strings 3 of casing material 2, in which a plurality of pockets 4 are arranged. The pockets are defined by at least one longitudinal connecting line 5 extending parallel to the longitudinal direction of the string and a plurality of transverse connecting lines 6 extending transversely to the longitudinal direction of the string. Preferably the strings comprise casing material of a folded piece of material, where the fold line extends in the longitudinal direction of the string. The closing longitudinal connecting line 5 is arranged at the opposite side of the string. Transverse connecting lines then extend between the fold line and the longitudinal connecting line. Alternatively, it is possible to use two or more pieces of material for making each string, in which case additional connecting lines may be required.

In the mattress, the springs are oriented in the pockets so that the connecting lines are arranged at the side of the springs and, thus, between neighbouring springs. Preferably, the casing material portions at the ends of the springs are thus essentially free of other connections.

According to the invention, for at least one of the springs, the casing portions arranged at the ends of the springs are moved towards each other, through the spring, and connected to each other by connecting means 7 to provide at least a certain degree of bias. Preferably the casing portions are moved so far towards each other as to make contact with each other, but of course it is possible to interconnect them also otherwise, by wire, a long clamp or the like. The connecting means may consist of a mechanical connecting element, such as a clamp, a rivet or the like, or by a surface joint, such as an adhesive, a weld or the like. Other fixing elements are, however, also conceivable. The load on the fixing element is normally small since the fixing elements are only loaded when the mattress is unloaded, whereas there is no load at all when the mattress is loaded.

However, the end portions are preferably connected to each other by welding, in which case a weld surface is arranged to connect the end portions to each other. The size and/or the location of the weld can advantageously be controllable and may be selected to give a desired height of the mattress and bias of the springs.

Coil springs of many sizes can be used in connection with the present invention, and basically any size of spring can be used. However, it is preferred to use springs with a diameter of 2-10 cm, most preferred about 6 cm. The springs preferably comprise at least three turns, preferably fewer than 10 turns. Moreover they are advantageously made of spiral wire with a thickness in the range 0.5-3.0 mm, preferably a wire thickness in the range 1.25-2.50 mm. Preferably the springs are slightly spool-shaped, that is with smaller turns at the top and bottom.

In a mattress as described above, as illustrated in FIGS. 1 and 3, the strings with springs are preferably arranged side by side and fixed to each other. Preferably the rows are connected to each other by fixing points 8, which advantageously connect the longitudinal connecting line 5 of one string to the side of the neighboring string. Of course, a smaller or greater number of fixing points than is shown is conceivable. It is also possible to arrange a longer fixing line instead of a plurality of shorter fixing points. The connection of strings to each other can occur by welding or gluing. Also this connection can, however, alternatively occur by means of clamps, by Velcro tape, or in some other suitable manner.

By arranging the interconnection of the strings via the longitudinal connecting line, automatic separation of the strings is provided, without requiring additional casing material. This is advantageous on the one hand since it results in a mattress with fewer springs, which has been found very favorable from the viewpoint of comfort and, on the other, since the mattress will thus be more cost-effective.

The mattress according to the invention can be manufactured by enclosing springs in pockets in strings of a casing material, said pockets being made of a continuous casing material with at least one longitudinal connecting line extending parallel to the longitudinal direction of the string and a plurality of transverse connecting lines extending transversely to the longitudinal direction of the string. Moreover there are included the steps of moving casing portions arranged for the ends of the spring towards each other and connecting them to each other and interconnecting a plurality of strings side by side.

For instance, the strings can be manufactured by the casing material being folded in two, and transverse welds being arranged to form open pockets. Subsequently compressed springs are inserted into the pockets, after which the pockets are sealed by a weld extending along the string. Moreover there is arranged, without turning the springs, an additional weld through each spring for connecting the end portions to each other, and a plurality of springs are joined side by side to form a mattress, the longitudinal welds being positioned between the strings.

The steps can be performed in different orders, and so that the connecting lines are arranged at the side of the springs and, thus, between neighboring springs. The step of moving the end portions towards each other usually implies that bias occurs by connection by means of connecting elements in such a manner that the springs in the biased state have a smaller longitudinal extent than in the original, non-biased state. Such bias can occur either directly after encapsulating the springs in the casing material, that is before they are assembled to form a mattress, or once the mattress is assembled. Preferably, however, bias occurs before the springs are enclosed in the pockets of strings, in which case it is possible to use a considerably smaller amount of casing material. Especially, smaller the amount of casing material, the greater the bias, and the thinner the mattress. In this manner, conveniently all springs in the mattress layer are biased.

In the manufacture of mattresses, it may also be ensured, as discussed above, that at least two neighboring strings are connected to each other so that an intermediate separation distance is provided between them.

Figure 3:
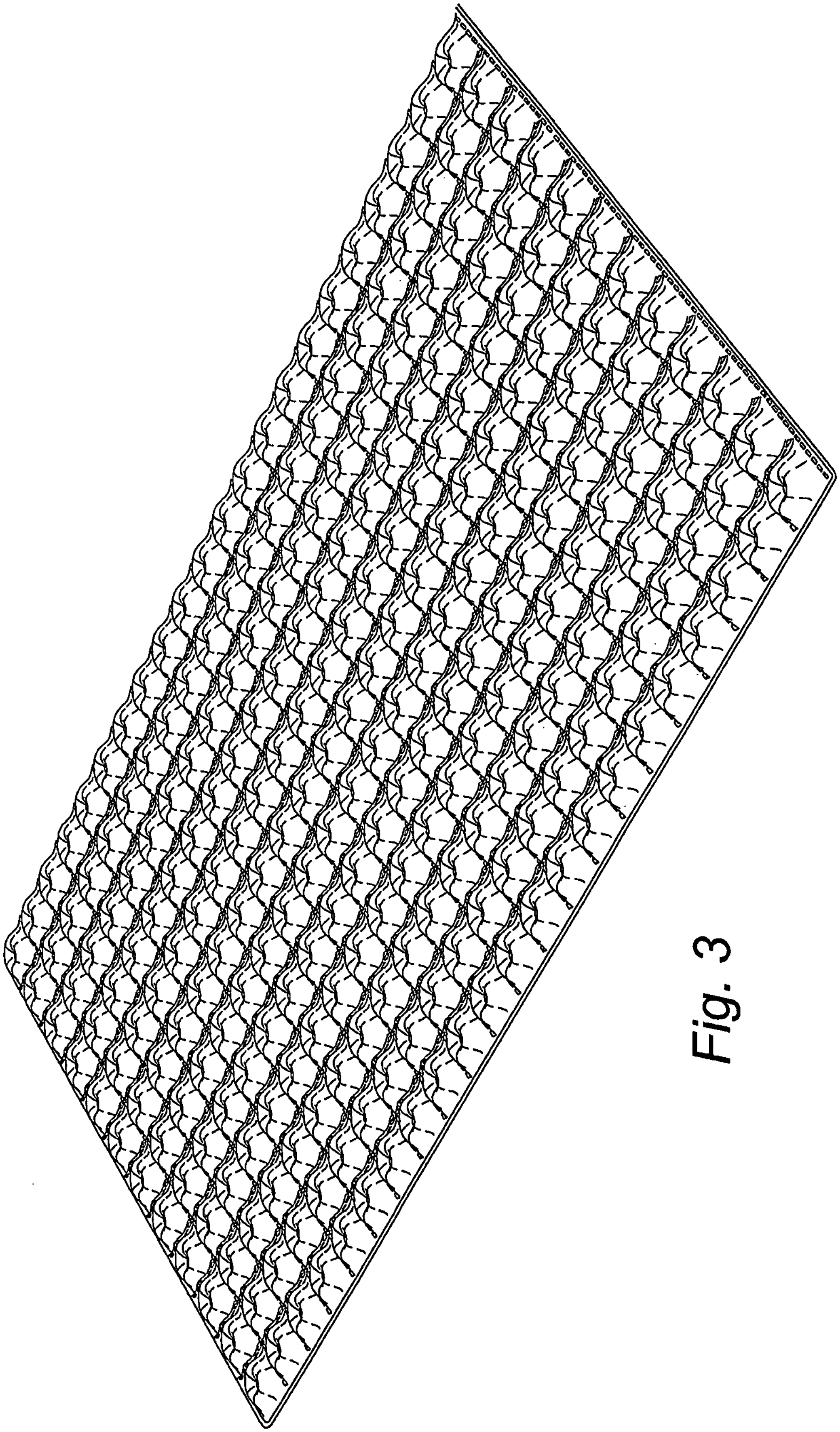
FIG. 3 is a perspective view obliquely from above of the mattress in FIGS. 1 and 2.

Moreover the strings with springs are preferably interconnected side by side, as indicated in FIG. 3 for instance. As mentioned above, this can take place by arranging fixing points on the longitudinal connecting lines for fastening at the side of neighboring strings.

Figure 4:
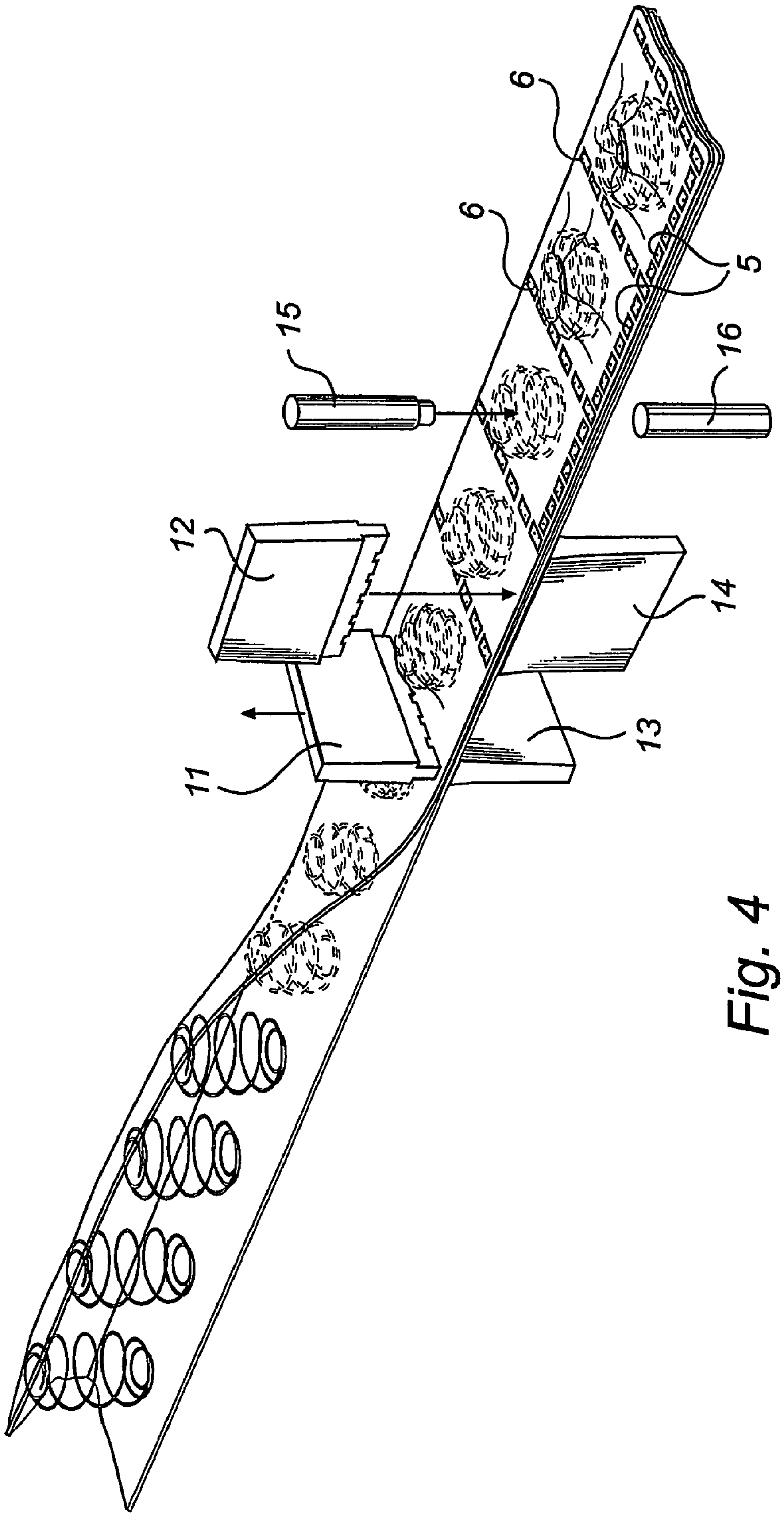
FIG. 4 is a schematic perspective view obliquely from above of a device for manufacturing a mattress according to an embodiment of the invention.

A device for carrying out the method above comprises means for enclosing coil springs in pockets of strings, said pockets being made of a continuous casing material with at least one longitudinal connecting line extending parallel to the longitudinal direction of the string and a plurality of transverse connecting lines extending transversely to the longitudinal direction of the string. These means may comprise a device for folding casing material around a row of springs, and equipment for welding of connecting lines in the folded casing material, as schematically illustrated in FIG. 4. Instead of compressing the springs when placed in the casing, and while the casing is being folded over them, it is alternatively possible to compress the springs separately and then, in the compressed state, insert them into the folded casing.

The welding equipment preferably comprises welding dies 11, 12 which are movable towards the casing material, and corresponding anvils 13, 14 on the opposite side. Preferably separate pieces of welding equipment are arranged to generate the longitudinal connecting lines and the transverse connecting lines respectively. The means for enclosing the coil springs is adapted to arrange the connecting lines at the side of the springs so that they are positioned between neighboring springs of the completed mattress.

Moreover the device comprises means for moving casing portions arranged for the ends of the spring towards each other and connecting them to each other and means for interconnecting strings side by side.

The means for moving casing portions arranged for the ends of the spring towards each other and connecting them to each other preferably comprises an insertion means 15 and, arranged at a distance therefrom, an anvil 16. In use, springs are placed so that one end faces the insertion means and the other the anvil. The insertion means is movable towards and away from the anvil to move casing material at one spring end through the spring towards the casing material on the other side. The insertion means 15 is preferably a welding die for generating a connecting weld. Alternatively, however, other fixing means can be provided instead. It is also possible to use a movable anvil, in which case means on both sides of the spring are pressed towards each other, after which stitching, welding or similar connecting may occur.

A system according to the invention can advantageously comprise a plurality of parallel devices, such as two devices operating in parallel.

Moreover means are included for interconnecting the strings with springs preferably side by side, as indicated in FIG. 3 for instance. As mentioned above, this can take place by arranging fixing points on the longitudinal connecting lines for fastening to the side of neighboring strings.

It is preferred for the bias of the springs to be performed so that the length of the springs in the biased state is less than ⅔ of the length of the same springs in the non-biased original state, and preferably less than ½. It is also preferred for the ratio between the length of the springs and the diameter thereof in the biased state to be less than 2, and preferably less than 1, and most preferred less than ½.

The mattress stated above ensures guiding of the spring, which thus is prevented from turning or the like. In contrast to prior-art mattresses, the new mattress comprises, however, pocket strings where the springs are inserted through openings in the lateral direction which are then welded together, but where the springs have then not been turned. As a result, the weld will be arranged along the sides of the springs instead of over the ends. Moreover the smooth end portions are moved towards each other and attached by welding for instance. Therefore very thin mattresses can be provided in this manner, in fact down to a thickness of one or a few centimeters. For example, a mattress with a thickness of 25 mm can be provided. Thus the invention is well suited for seat cushions, overlay mattresses to be placed on top of other mattresses and similar applications where thin mattresses are required. Thus being able to make overlay mattresses of pocket springs is very advantageous, not only because they can be made softer, thereby increasing the comfort, but also because springs are normally not fatigued over time, as is polyethylene or like materials. Mattresses according to the invention can be made very light, soft and comfortable, and also, due to the bias, very rigid and hard, as desired.

The invention makes it possible to easily adjust the height of the spring elements by varying the position and size of the fixing means when connecting the end portions to each other. In this way it is also easy to provide different thicknesses of different portions of the mattress, or provide mattresses of different thicknesses, without having to make any changes in the manufacturing process in addition to this connection. The manufacture will in this way be very flexible and controllable. In particular it is possible to provide mattresses with a cup shape or the like to be used as seat cushions or other mattresses intended for sitting. Similar changes of height can also be used in other mattresses to control the user's position on the mattress.

The invention has been described above by way of embodiments. Several variants of the invention are, however, conceivable. For instance, as mentioned above, other types of fixing elements can be used, as well as other casing materials, spring sizes etc. Furthermore the device and the method can be designed in other ways. Such obvious variants must be considered to be comprised by the invention as defined by the appended claims.

The invention claimed is:

1. A spring mattress including a plurality of strings interconnected side by side, each string of the plurality of strings comprising:

a continuous casing material with a plurality of pockets, said plurality of pockets being defined by at least one pocket defining longitudinal connecting line extending parallel to a longitudinal direction of the string and a plurality of transverse connecting lines extending transversely to the longitudinal direction of the string, and at least one coil spring in at least one pocket of the plurality of pockets of the string, wherein portions of the casing material at the ends of the at least one coil spring are moved towards each other through the at least one coil spring and the portions of the casing material are connected to each other, the pocket defining longitudinal connecting line and the transverse connecting lines are at the side of the at least one coil spring and between neighboring coil springs, the plurality of strings are connected to each other via at least one string connecting longitudinal connecting line, the at least one pocket defining longitudinal connecting line and the at least one string connecting longitudinal connecting line coincide with each other, and the at least one pocket defining longitudinal connecting line and the at least one string connecting longitudinal connecting line form a continuous tab along the longitudinal direction of the string and extending away from the plurality of springs, the at least one pocket defining longitudinal connecting line and the at least one string connecting longitudinal connecting line configured to provide a separation between adjacent strings.

2. The spring mattress as claimed in claim 1, wherein the interconnected casing material portions at the ends of the at least one coil spring do not include connections in addition to the connections joining said portions of the casing material.

3. The spring mattress as claimed in claim 1, wherein the casing portions at the ends of the at least one coil spring are moved towards each other to contact with each other.

4. The spring mattress as claimed in claim 1, wherein the casing portions at the ends of the at least one coil spring are moved towards each other such that the at least one coil spring is biased.

5. The spring mattress as claimed in claim 1, wherein the at least one string connecting longitudinal connecting line includes a surface joint, the surface joint being at least one of an adhesive and a weld.

6. The spring mattress as claimed in claim 1, wherein the casing is a weldable textile material.

7. The spring mattress as claimed in claim 1, wherein the at least one coil spring, through which the casing material portions are moved towards each other, has a height below 6 cm.

8. The spring mattress as claimed in claim 1, wherein the at least one coil spring, through which the casing material portions are moved towards each other, has a height which is less than about ⅔$^{rd}$ the width of the at least one coil spring.

9. The spring mattress as claimed in claim 1, wherein the at least one pocket defining longitudinal connecting line, the at least one string connecting longitudinal connecting line and the plurality of transverse connecting lines of the strings extend substantially at right angles to the longitudinal axes of the at least one coil spring.

10. The spring mattress as claimed in claim 1, wherein the at least one pocket defining longitudinal connecting line, the at least one string connecting longitudinal connecting line and the plurality of transverse connecting lines of the strings extend in essentially a same plane, the plane being substantially perpendicular to the longitudinal axes of the at least one coil spring.

11. The spring mattress as claimed in claim 1, wherein the at least one coil spring, through which the casing material portions are moved towards each other, has a height below 5 cm.

12. The spring mattress as claimed in claim 1, wherein the at least one coil spring, through which the casing material portions are moved towards each other, has a height below 4 cm.

13. The spring mattress as claimed in claim 1, wherein the at least one coil spring, through which the casing material portions are moved towards each other, has a height which is at most ½ the width of the at least one coil spring.

14. A method for manufacturing a spring mattress, the method comprising:

enclosing at least one coil spring in at least one pocket of a plurality of pockets formed in a string of a casing material, said at least one pocket being of a continuous casing material with at least one pocket defining longitudinal connecting line extending parallel to a longitudinal direction of the string and a plurality of transverse connecting lines extending transversely to the longitudinal direction of the string;

moving casing portions at the ends of the at least one coil spring towards each other and connecting the casing portions to each other; and interconnecting a plurality of strings side by side, wherein the pocket defining longitudinal connecting line and the transverse connecting lines are arranged at the side of the at least one coil spring and between neighboring coil springs, the plurality of strings are connected to each other via at least one string connecting longitudinal connecting line, the at least one pocket defining longitudinal connecting line and the at least one string connecting longitudinal connecting line coincide with each other, and the at least one pocket defining longitudinal connecting line and the at least one string connecting longitudinal connecting line form a continuous tab along the longitudinal direction of the string and extending away from the plurality of springs, the at least one pocket defining longitudinal connecting line and the at least one string connecting longitudinal connecting line configured to provide a separation between adjacent strings.

15. The method of claim 14 further comprising:

moving the casing portions towards each other so as to make contact with each other.

16. The method of claim 14 further comprising:

moving the casing portion towards each other such that the at least one coil spring is biased.

17. The method of claim 14 further comprising:

joining the at least one string connecting longitudinal connecting lines of adjacent strings by surface joining, the surface joining including at least one of gluing and welding.

18. The method as claimed in claim 14, further comprising:

biasing the at least one coil spring before enclosing the at least one coil spring in the at least one pocket formed in the string of the casing material;

moving the casing portions at the ends of the at least one coil spring towards each other;

connecting the casing portions to each other; and maintaining at least a part of the coil spring bias in a manufactured mattress.

19. The method as claimed in claim 14, wherein enclosing the at least one coil spring in at least one pocket in the string of the casing material comprises:

inserting the at least one coil spring between a folded sheet of casing material;

arranging, before or after inserting the at least one coil spring, transverse connecting lines extending transversely to the at least one pocket defining longitudinal connecting line and the at least one string connecting longitudinal connecting line to form the at least one pocket for receiving the at least one coil spring; and arranging the at least one pocket defining longitudinal connecting line and the at least one string connecting longitudinal connecting line to coincide with each other and extend parallel to the longitudinal direction of the string, said at least one pocket defining longitudinal connecting line sealing said at least one pocket.

20. A device for manufacturing spring mattresses, comprising:

means for enclosing at least one coil spring in at least one pocket of a plurality of pockets of a string, said plurality of pockets being made of a continuous casing material with at least one pocket defining longitudinal connecting line extending parallel to the longitudinal direction of the string and a plurality of transverse connecting lines extending transversely to the longitudinal direction of the string;

means for moving casing portions at the ends of the at least one coil spring towards each other and connecting the casing portions to each other; and means for interconnecting a plurality of strings side by side;

wherein the means for enclosing the at least one coil spring are configured to arrange the at least one pocket defining longitudinal connecting line and transverse connecting lines at the side of the at least one coil spring so as to be positioned between neighboring coil springs of a completed mattress, and wherein the means for interconnecting strings side by side is configured to connect the strings to each other via at least one string connecting longitudinal connecting line, the at least one pocket defining longitudinal connecting line and the at least one string connecting longitudinal connecting line coincide with each other and the at least one pocket defining longitudinal connecting line and the at least one string connecting longitudinal connecting line form a continuous tab along the longitudinal direction of the string and extending away from the springs, the at least one pocket defining longitudinal connecting line and the at least one string connecting longitudinal connecting line configured to provide a separation between adjacent strings.

21. The device as claimed in claim 20, wherein the means for moving casing portions at the ends of the at least one coil spring towards each other and connecting the moved casing portions to each other includes a welding equipment movable in a direction of the at least one coil springs.

22. The device as claimed in claim 21, wherein the welding equipment is adjustable and a size of the generated weld being controllable.

* * * * *